United States Patent [19]
Ludlow

[11] Patent Number: 5,275,149
[45] Date of Patent: Jan. 4, 1994

[54] POLAR AXIS SOLAR COLLECTOR

[76] Inventor: Gilbert T. Ludlow, R.R. #1, Barrie, Ontario, Canada, L4M 4Y8

[21] Appl. No.: 980,618

[22] Filed: Nov. 23, 1992

[51] Int. Cl.$^5$ ............................................. F24J 2/16
[52] U.S. Cl. .................................... 126/686; 126/605; 126/607; 126/589
[58] Field of Search ............... 126/685, 686, 687, 600, 126/605, 606, 607, 589

[56] References Cited

U.S. PATENT DOCUMENTS

| | | | |
|---|---|---|---|
| 3,171,403 | 3/1965 | Drescher | 126/685 |
| 3,988,166 | 10/1976 | Beam | |
| 4,059,226 | 11/1977 | Atkinson | |
| 4,068,474 | 1/1978 | Dimitroft | 126/439 X |
| 4,286,581 | 9/1981 | Atkinson, Jr. | |
| 4,295,462 | 10/1981 | Bunch | |
| 4,340,031 | 7/1982 | Niedermeyer | |
| 4,373,514 | 2/1983 | Lois | 126/439 X |
| 4,394,860 | 7/1983 | Smith | 126/451 X |
| 4,402,306 | 9/1983 | McElroy, Jr. | 126/439 X |
| 4,425,905 | 1/1984 | Mori | 126/685 |
| 4,696,285 | 9/1987 | Zwach | |
| 4,841,946 | 6/1989 | Marks | 126/451 |

OTHER PUBLICATIONS

Application & Maintenance for 3M Brand ECP-305 Specular Silver Reflective Film
Design and fabrication of a photovoltaic dish concentrator system by R. L. Davenport, Solar Engineering 1992, vol. 1, pp. 483–488.

*Primary Examiner*—James C. Yeung

[57] ABSTRACT

A polar column solar collector for use in association with a building, the system having a concave mirror located on the exterior of the building and defining a focal point and a central axis, a mounting column secured to the mirror coaxial therewith, a polar axis column, a hinge swingably connecting the mounting column to the polar axis column for moving the concave mirror to aim it directly at the sun at least over a predetermined period of the daylight hours, a secondary reflector located at the focal point of the concave mirror to receive the sun's rays reflected from the concave mirror, an opening in the concave mirror to receive a concentrated beam of the sun's rays reflected from the secondary reflector and to direct the beam along the mounting column, a third reflector movably located at the junction of the mounting column and the polar axis column to receive the concentrated beam of the sun's rays from the secondary reflector reflected through the opening, and to redirect it along the polar axis column, and a polar column rotator for rotating at least a portion of the polar column to track the movement of the sun.

10 Claims, 4 Drawing Sheets

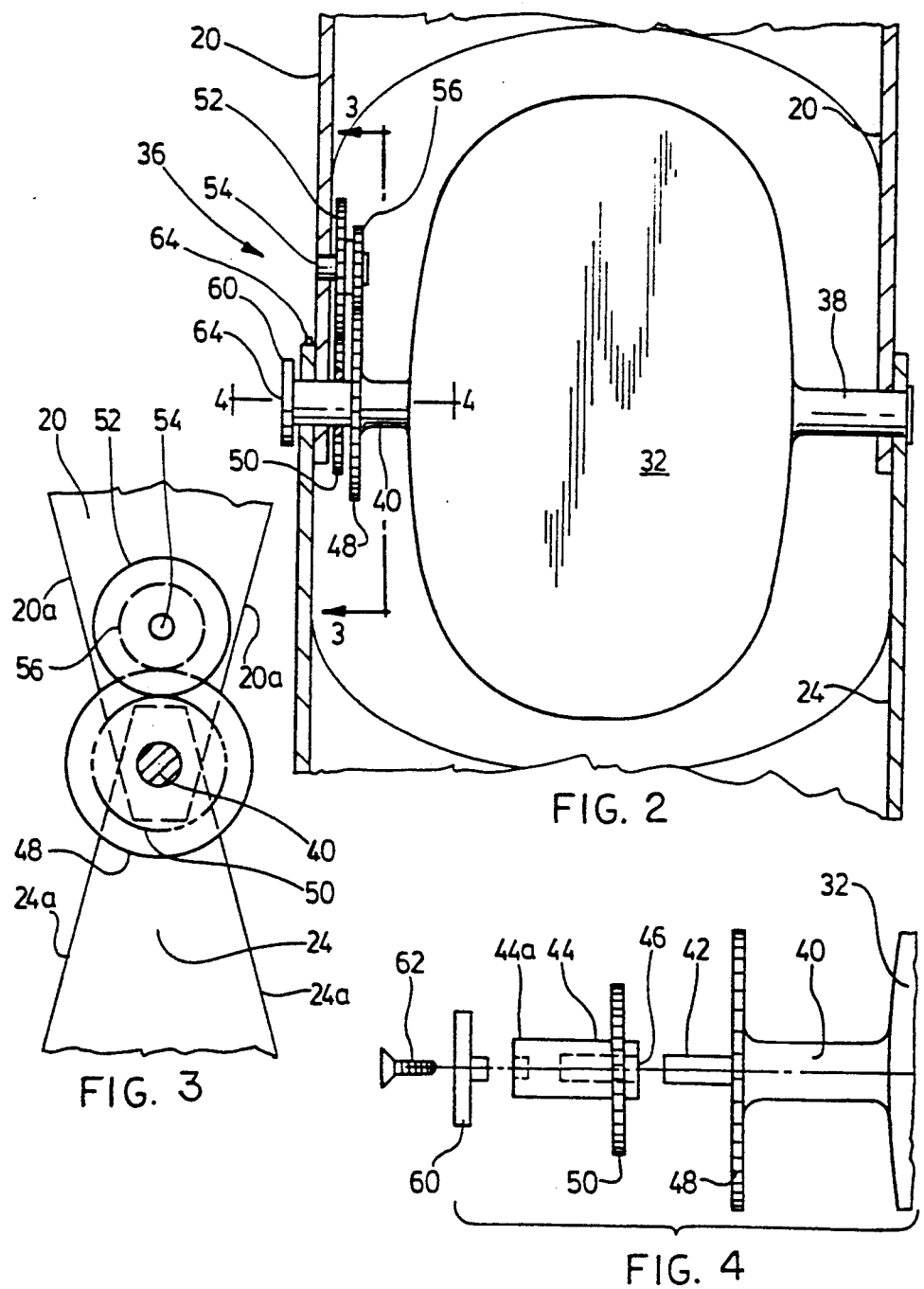

POLAR AXIS SOLAR COLLECTOR

FIELD OF THE INVENTION

The invention relates to solar collectors, and in particular to a polar column solar collector for collecting solar energy in the form of light, and for transmission of such solar energy as a concentrated light beam into the interior of an insulated building.

BACKGROUND OF THE INVENTION

Solar energy appears to be the single most attractive source of energy. Solar systems are not liable to wind damage, as is the case with wind energy systems except in extreme weather conditions, which are exceptional, and would damage even conventional energy transmission systems. Solar collector can be installed almost anywhere, unlike tidal energy systems which must be located in coastal areas. Solar energy systems consume no fuel and the energy is, therefore, "free", in a sense. It causes no emissions to pollute the environment. It does not appear to require complex transmission and delivery systems such as electrical power lines, gas or oil pipe lines, or other delivery systems, provided it can be collected "on site", i.e., where it is to be used.

Solar energy has however one major disadvantage, namely, that it is available only intermittently, in the hours of daylight. Accordingly, it is obvious that sufficient solar energy must be collected during the hours of daylight, that a sufficient quantity of energy can be stored, for reuse during the hours of darkness when solar energy is not available. Clearly, systems could be engineered to carry out these functions on a very large scale. However, that would then require the collection and storage of large quantities of solar energy which would then have to be transmitted from place to place, for example, to a large number of homes, connected to a central solar collector. This would result in excessive capital costs, and would likely result in relatively high energy transmission losses. Clearly, such centralized systems would fail to take advantage of the principal significant fact concerning solar energy, namely, in that it is substantially universally available over a large portion of the face of the earth, and thus does not require special transmission systems, to transmit the energy from one place to another. The theoretically ideal solar energy system would be self-contained, so that individual systems could be provided for individual buildings or homes, so that each building or home could be essentially energy self-sufficient. In this way, complex transmission or storage systems would not be required.

It is however apparent that in the design of any solar energy collector system it will be necessary to collect solar energy falling on a relatively substantial surface area, to provide sufficient energy even for a single home or building. In order to achieve this, numerous proposals have been made for providing solar collectors based on some form of concave curved mirror usually of parabolic shape having a relatively large surface area. The mirror catches the sun's rays falling on all points of the mirror, and concentrates them into a single point, resulting in a high energy concentration of light at that point. Usually, at the focal point of the mirror, a secondary reflector is provided for reflecting the concentrated point of light, and redirecting it, so as to convert the energy of the concentrated light beam into some other form of energy. Typical proposals of this general type are shown in, for example, U.S. Pat. Nos. 4,286,581, 4,295,462, 4,340,031, and 4,696,285. It is, of course, implicit in any of these solar collector devices that the actual mirror itself must be located in the open air. In all of these proposals, the mirror concentrates the solar energy falling on the mirror at the focal point of the mirror. The concentrated light is re-directed into a portion of the collector where the energy of the light beam is then converted into heat. For example, in U.S. Pat. No. 4,286,581, the solar energy is utilized to heat a tubular chamber, or cavity, and a fluid medium is passed through the chamber or cavity, and absorbs the heat from the concentrated light rays. The energy in the fluid is then transported to some other location for use. In these proposals the mirror was usually mounted on some form of a suitable equatorial tracking mount, so that the mirror could always be pointed directly at the sun. Accordingly, in the proposals of the type described above, it was usually necessary for the entire apparatus consisting of the mirror, the secondary reflector, and also the heat conversion chamber, all to be mounted together and moved simultaneously to track the path of the sun. Such systems therefore require highly complex suspension and tracking mechanisms, to provide the facility for accurate tracking of the sun, by all of the components simultaneously and also require heat transmission systems for transmitting the heat from the outside to the inside of a building.

Other proposals for collecting solar energy have been made of a more simplistic nature, for example as shown in U.S. Pat. No. 4,059,226. In this type of proposal, large chambers are filled with any suitable heat storage medium. In this case, the medium is simply rock or stone. The chambers are fixed in position, and have glass panels through which the sun's rays may pass and heat up the stones. In the particular example, of this patent, insulating panels are adapted to be swung down over the glass panels, when the heat generated by the sun's rays falls below a certain preset minimum temperature.

Systems of this kind are relatively massive installations, and are suitable in only relatively limited "sun belt" portions of the globe, and must obviously be located for optimum operation in a fixed location, i.e., facing south in the northern hemisphere.

Another proposal is shown in U.S. Pat. No. 3,988,166. In this patent, a concave mirror is provided, mounted on a suitable tracking mount, and having a secondary light concentration mirror at the focal point. The light falling from the main mirror on the secondary mirror is concentrated into a light beam. A central opening in the main mirror allows this concentrated light beam to pass through the main mirror. An energy collection chamber is provided immediately behind the main mirror, for receiving energy from the concentrated light beam. The converted energy is then transmitted from this chamber, to a location where it may be of use. While this system is somewhat simpler to construct, it still has the disadvantage that the energy conversion takes place out of doors, and requires the transmission of an energy conversion medium, typically, for example, a fluid medium, from the solar collector itself into the building or facility where the energy is required, typically to heat the building or to provide hot water for a domestic hot water system. Thus thick insulation must be provided to limit heat losses in transmission.

In a further proposal, in U.S. Pat. 4,373,514 granted on Feb. 15, 1983 to Lois, there is shown a form of solar collector system in which the collimate beam is routed through a conduit, around various angles. This system uses at least three separate mirrors, to bring the light beam along the angled conduit, to a point where it could be converted. However Lois does not disclose an equatorial mount for tracking the sun's path each day, and each day of the year, and consequently would have very little if any efficiency. In addition, the use of three separate mirrors within the conduits produces further heat transmission losses, which accumulate from mirror to mirror. Consequently, the system would be impractical for the purposes of for example domestic heating or heating of individual buildings, and would be extremely expensive.

BRIEF SUMMARY OF THE INVENTION

With a view to overcoming the various problems noted above, the invention comprises a polar column solar collector system for use in association with a building located at a predetermined latitude, defining an exterior and interior, and said system comprising, generally concave collector mirror means having front and rear sides and being adapted to be located on the exterior to receive the rays of the sun and defining a focal point, and being moveable whereby to aim the same directly at the sun, at least over a predetermined period of daylight hours, secondary reflector means located on said front side with a common focal point with said collector mirror means whereby to receive the sun's rays reflected from said collector mirror means and redirect them on a central axis, opening means located in said collector mirror means substantially along said central axis thereof and adapted to receive a concentrated beam of the sun's rays reflected from said secondary reflector means, a mounting column secured to the mirror coaxial therewith, a polar axis column means swingably connected to the mounting column means for rotating at least a portion of the polar axis column means, and for swinging the mounting column whereby to move the mirror to aim it directly at the sun at least over a predetermined period of the daylight hours, third reflector means movably located on the rear side of said collector mirror at the junction of said mounting column and said polar axis column means to receive said concentrated beam of the sun's rays from said secondary reflector reflected through said opening means, and to redirect the same along said polar axis column means and said polar axis column means being adapted to be mounted on an axis parallel to the polar axis of the earth, at a predetermined latitude and to pass from the exterior to the interior of said building, for energy conversion within said building interior and rotatable means in said polar axis column whereby said mounting conduit can be rotated through a predetermined arc.

The invention further provides such a polar axis solar collector system wherein said third reflector means is a moveable reflector moveable on an axis transverse to the central axis of said mounting column, and wherein said collector mirror means is moveable on an axis transverse to said polar axis column means, movement of said third reflector means being co-ordinated with movement of said mounting column means and said collector mirror means, whereby to maintain said light beam along a path passing along the interior of said polar axis column means.

The invention further comprises such a solar collector system and wherein at least said third reflector means includes cooling means for cooling said third reflector means and means for circulating a cooling medium therethrough.

The invention further comprises such a solar collector system, and including cooling means for said secondary reflector.

The various features of novelty which characterize the invention are pointed out with particularity in the claims annexed to and forming a part of this disclosure. For a better understanding of the invention, its operating advantages and specific objects attained by it use, reference should be had to the accompanying drawings and descriptive matter in which there are illustrated and described preferred embodiments of the invention.

IN THE DRAWINGS

FIG. 2 is a section along the line 2—2 of FIG. 1, showing the third mirror in elevation;

FIG. 3 is a schematic section along the line 3—3 of FIG. 2 showing the gear train mechanism linking the mounting column with the mirror;

FIG. 4 is an exploded view of the portion of the mirror and gear mechanisms shown along the line 4 of FIG. 2 showing the method of adjusting the mirror angle;

DESCRIPTION OF A SPECIFIC EMBODIMENT

As already explained above, the invention relates principally to a polar axis solar collector system of the type which is adapted to be asspciated with, or installed above or on a building, for example a domestic dwelling. Obviously however depending upon the capacity and engineering of the system, it could be adapted to provide solar heating for larger buildings. In essence, the invention seeks to provide a solar collector system which may be located closely associated with a building wherein the light beam is transmitted into the building interior, and wherein conversion into useful energy takes place within the building.

In this way there is no requirement for extended energy transmission systems. This, in turn, will both reduce heat losses in the system and, therefore, increase its efficiency, and at the same time reduce the overall capital cost. The freedom from the requirement for transmission systems will reduce the energy requirements demanded from outside energy utility generation systems, and this will, in turn, reduce the need for continually increasing capital expenditures on large scale utility systems, most of which result in environmental damage of one kind or another, and in addition, require the erection of unsightly and costly transmission systems of one kind or another. In terms of the individual buildings, the solar collectors in accordance with the invention will have an appearance which, may be somewhat similar to that of television satellite signal collector systems. Such systems appear to be in wide use in many residential and rural neighborhoods without any apparent significant degree of objection.

Figure 1:
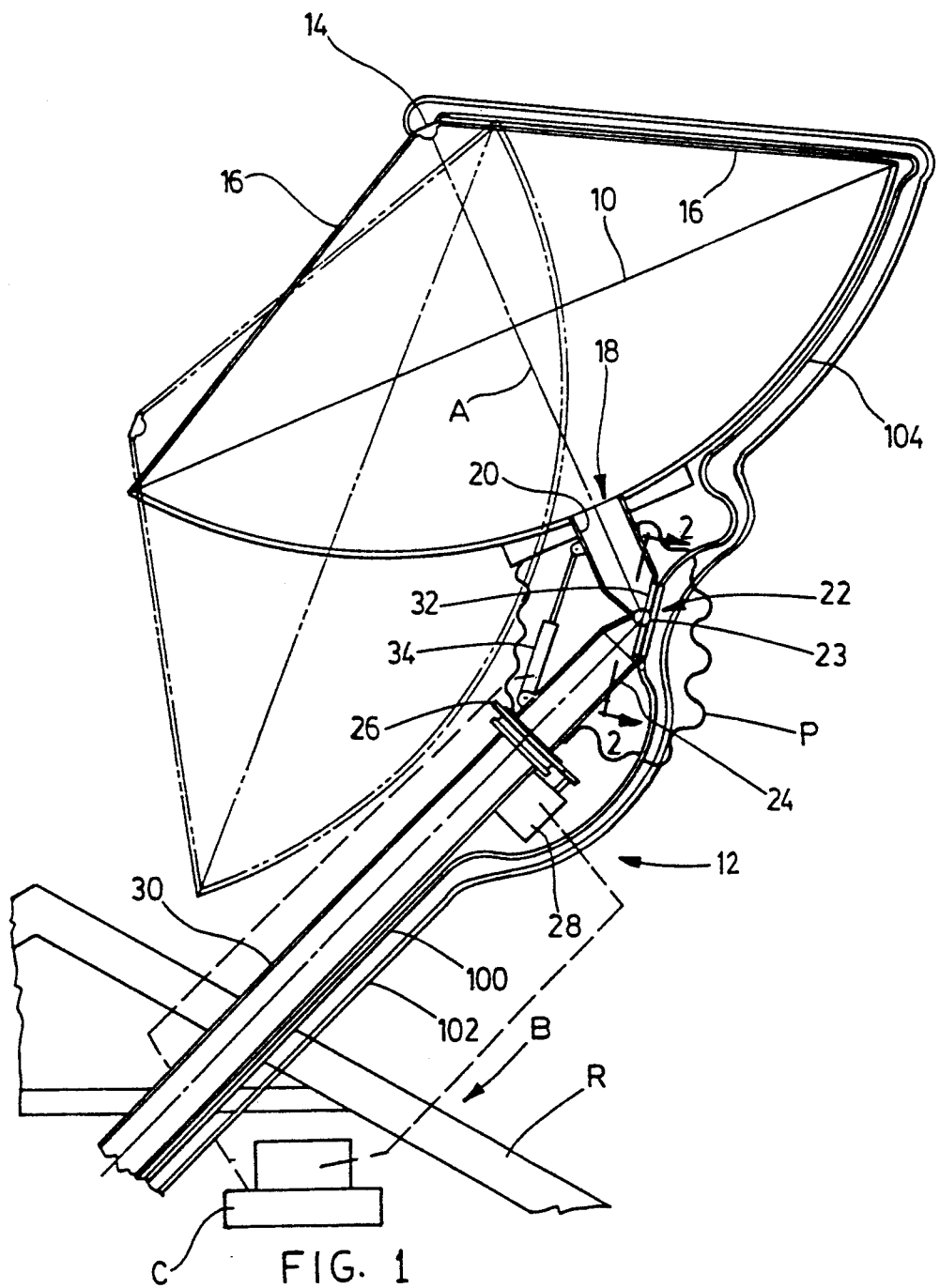
FIG. 1 is a side elevation of a polar column solar collector system in accordance with the invention, shown in association with a typical building.

Referring first of all to FIG. 1, such a building is indicated as the general reference B, and has roof R. In the particular case illustrated, the building B represents a domestic dwelling, although obviously it could be any one of a wide variety of different buildings. It defines an interior space enclosed within the building, and outside the building is the open air. Normally buildings will incorporate thermal insulation within their exterior walls and roof, adequate for the location of the building on the earth's surface and the climatic and environmental conditions. Such insulation is omitted from the actual drawings since it is obviously well known, and requires no special description obviously, such insulation may either be insulation to prevent heat loss from the building, during the colder months, or, in hotter climates, may be insulation to reduce the heat gain in the interior of the building, from the ambient temperature of the surrounding exterior.

For the present purposes, it is not necessary to make a distinction between the two, since the invention is directed to the collection of solar energy, which energy may be used either for heating a building, or for providing energy for cooling the building.

As illustrated in FIG. 1, the solar collector system comprises a concave collector mirror 10, mounted on a moveable mounting system 12. The mounting system 12 is shown passing into the interior of the building, and the details will be explained as the present description proceeds.

The concave mirror 10 is similar to concave mirrors used in other solar collector systems, that is to say, it will typically be a parabolic mirror, defining a predetermined focal point located along the central axis A of the mirror. It is a basic law of optics in relation to such mirrors that when parallel rays of light fall upon such mirror, along axes parallel to such central axis, that they are all reflected back to the focal point. Thus provided the central axis of such a parabolic mirror is directed directly at the sun, the sun's rays falling on the surface of the mirror will all be reflected back to the focal point. This will thus produce a highly concentrated point of light energy at the focal point.

A secondary reflector or mirror 14 is provided, being usually a convex mirror of a relatively small size located with its focal point coincident with the focal point of the concave collector mirror 10. The secondary mirror 14 receiving the light reflected from all points on the concave mirror 10, is so shaped and designed that it will then re-reflect all of the light beams along an essentially linear central axis A. In the design of known solar collectors this beam is then usually directed at some form of energy conversion means adjacent the collector mirror.

In the present invention, the concave collector mirror 10. is provided with its secondary convex mirror 14, mounted on any suitable system of adjustable support arms 16, at the focal point of the concave collector mirror 10. The concave collector mirror is provided with a central axial opening 18, and the secondary convex mirror 14 is shaped and located and adjusted in such a way as to direct a concentrated beam of the sun's rays from collector 10 along the mirror central axis A through opening 18.

In accordance with the invention, the concave collector mirror is mounted on a mirror mounting column 20. Mounting column 20 is in fact a hollow tubular conduit, defining a hollow interior, the axis of which is aligned with the central axis of the concave collector mirror. Thus a light beam re-reflected by the secondary mirror 14, will pass through the opening 18 and be directed centrally along the axis of the hollow mirror mounting column 20.

Mirror mounting column 20 is swingably mounted at corner 22, by hinge 23 to a hollow tubular, rotatable polar column portion 24.

Polar column portion 24 is rotatably mounted by means of a coaxial rotatable coupling 26, and a motor drive 28, to a fixed coaxial polar column portion 30. Fixed hollow tubular column portion 30 extends into the insulated interior of a building B.

A third reflector means comprises a moveable mirror 32, at corner 22, located along the central axes of mounting column 20, and rotatable polar column portion 24, at hinge 23.

As best shown in FIGS. 2 and 3 both the mounting column 20 and mirror 32 are operable by means of a motor 34 (FIG. 1). A two to one gear train shown generally as 36 couples mirror 32 to the column 20, so that as mounting column 20 moves one degree, mirror 32 will move one-half a degree and so on.

In order to achieve this result, the mirror, which will be seen to be of generally elliptical shape, is mounted on right and left hand cross shafts 38 and 40. The right hand cross shaft (as illustrated in FIG. 2) but without limitation to either right or left in practice, is freely rotatable in registering openings formed in column 20, and polar axis column portion 24.

Thus the shaft 38 both acts as a pivot for the mirror 32 and also as the hinge axis for the column 20 and the polar axis column portion 24.

Again as viewed in FIG. 2, and without limitation, the left hand shaft 40 extends on the opposite side of the mirror 32 co-axial to the shaft 38, and is formed with a central hinge pin 42 (FIG. 4).

Pin 42 is received in a stub shaft 44 formed with an internal bearing recess 46 (FIG. 4).

A stub shaft extension 44a is adapted to extend through registering openings formed in the mounting column 20 and the polar axis column portion 24, and functions as the hinge axis about which the mounting column 20 moves relative to the rotatable polar axis column portion 24.

In order to provide the two-to-one reduction in rotational movement, described above, a first gear 48 is secured and fixed on shaft 40. A second gear 50, smaller than the first gear 48 is secured to the stub shaft 44.

A third gear 52 is rotatably mounted on a stub axle 54 (FIG. 2 and 4). A fourth gear 56 is also rotatable on axle 54, but is secured to third gear 52 to turn in unison therewith.

In order to adjust the position of the mirror to the exact angle required when the installation is being made in the first place, the stub shaft 44a is initially freely rotatable in the rotatable polar axis column portion 24. A hand knob 60 is releasably attached to the end of the stub shaft 44a by means such as a screw 62.

In this way, by simply turning the hand knob 60, the angular relationship between the mirror 32 and the mounting column 20, and polar axis column portion 24, can be adjusted.

Once it has been adjusted to the correct position, the stub axle 44 is then fixed in position by means of a set screw 64, set in the upper free end of the polar axis column portion 24 (FIG. 2).

As will be seen particularly from FIG. 3, the two ends of the respective mounting column 20 and polar axis column portion 24 are cut away so as to define arcuate side wall edges 20a—20a and 24a—24a respectively, so as to facilitate the hinging action at the corner 22 (FIG. 1).

It will be appreciated that in FIGS. 2 and 3, the column 20 and column portion 24 are shown in alignment, whereas in practice this could never occur, as will clearly be seen from the angular relationship of the components in FIG. 1.

It is drawn in somewhat distorted fashion in FIGS. 2 and 3 for the sake of clarity however.

It will be seen therefore that by means of this interconnecting gear mechanism 36, the strut-like motor 34 which is located exteriorly of the corner 22, in order to brace the junction at the corner 22, will, when it is operated, cause the mounting column 20, and the mirror 10, to move slightly. Such movement will be transmitted to the mirror 32 by means of the two-to-one reduction gear system 36 described above.

In order to operate at maximum efficiency, it is desirable to cool both mirror 14 and mirror 32.

Figure 5:
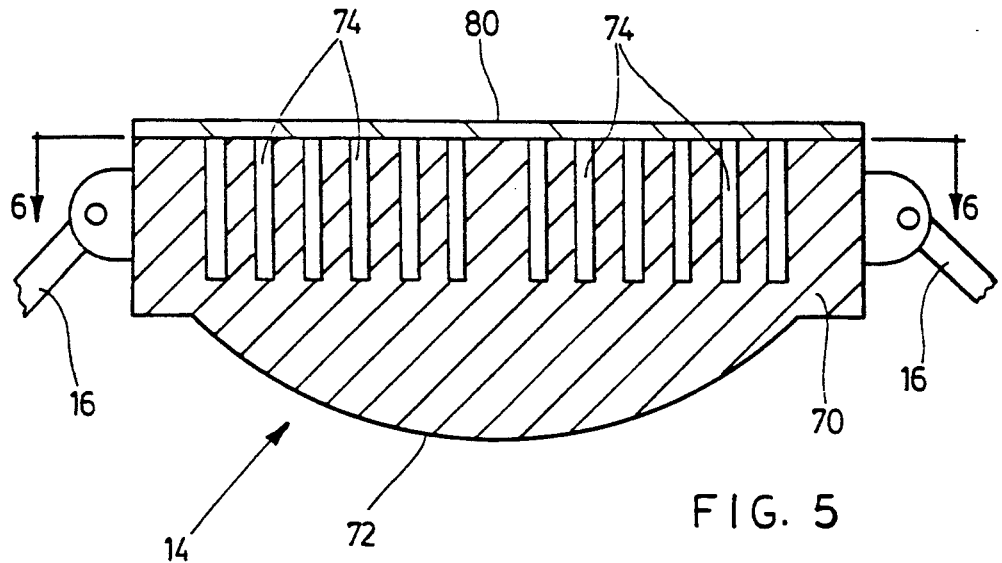
FIG. 5 is a section along the line 5—5 of FIG. 1, showing the secondary mirror.
Figure 6:
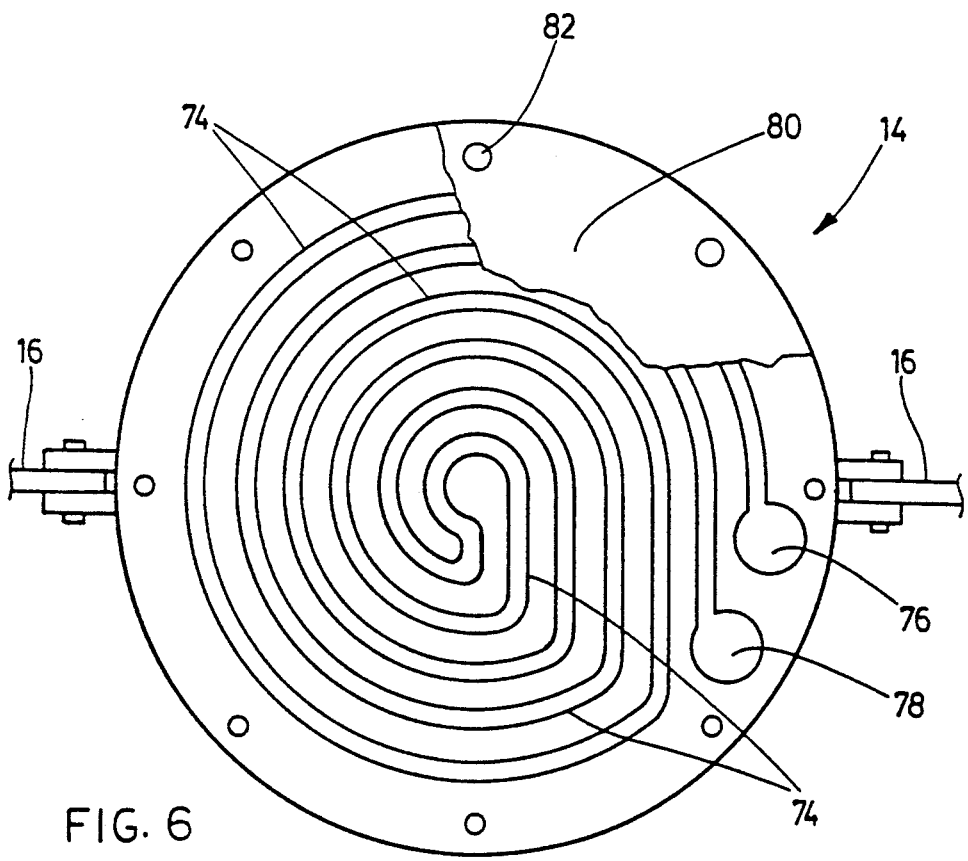
FIG. 6 is a plan view partially cut away of a secondary mirror of FIG. 5.

Referring now to FIGS. 5 and 6, the mirror 14 will be seen to be comprised in this illustration of a substantially solid block of metal indicated as 70, defining a convex mirror surface 72.

A continuous coolant channel 74 is formed in block 70, and terminates at two connection recesses 76 and 78. These one of the recesses is used for the input and the other of the recesses is used as the outlet, so that coolant can be made to flow continuously around the groove 74.

In this way, the heat build-up on the mirror 72 is kept within reasonable tolerances.

A plate 80 is secured to the back of the block 70 by fastenings indicated generally as 82 (FIG. 6).

Figure 7:
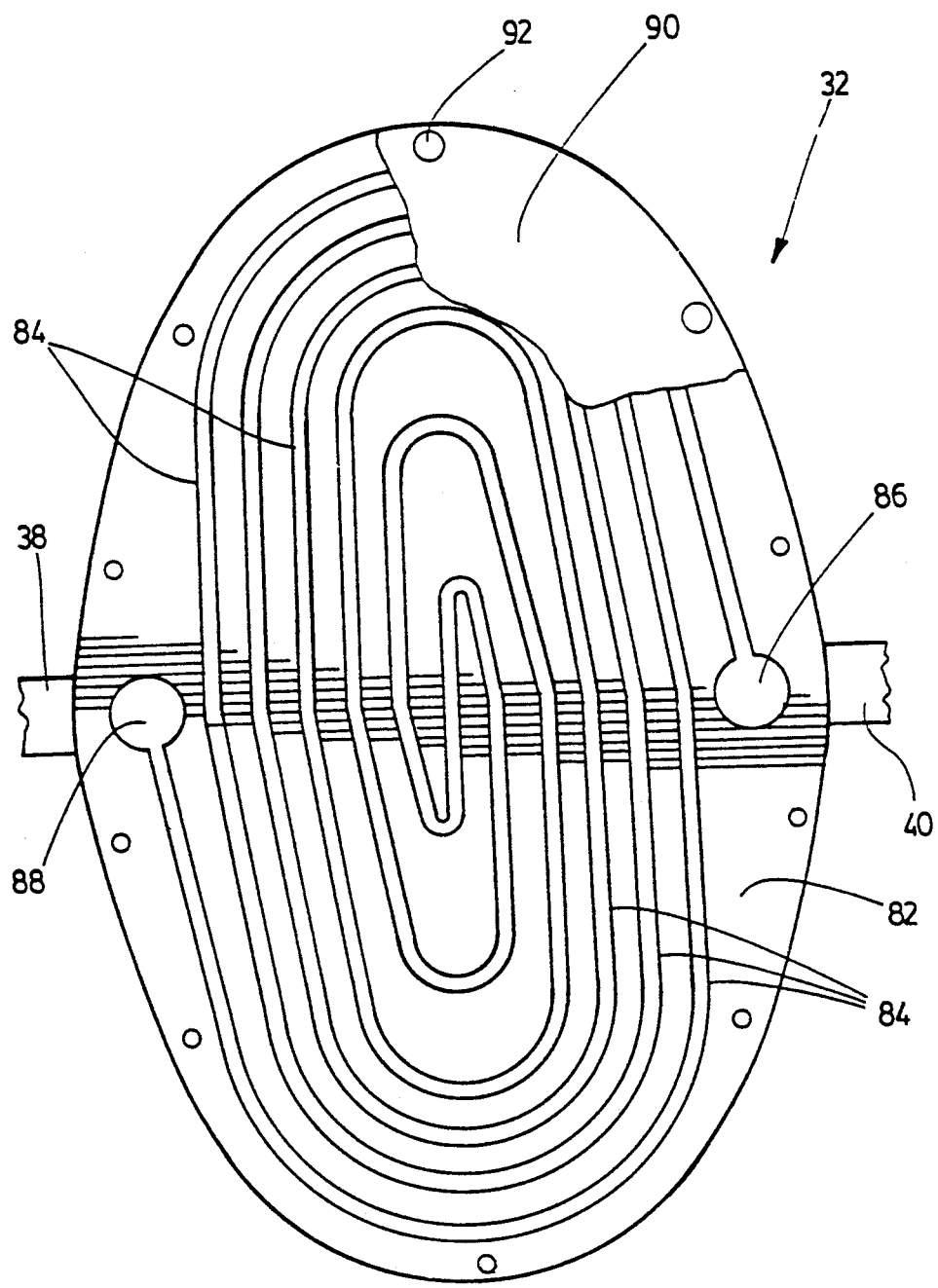
FIG. 7 is a rear plan view of the third mirror, partially cut away.

Similarly, in connection with mirror 32, as shown in FIG. 7, mirror 32 also consists of a block of metal indicated as 82 with a continuous groove 84. Two recesses 86 and 88, at opposite ends of the continuous groove 84, and facilitate the attachment of inlet and outlet connections.

A closure plate 90 is secured by fastenings 92 to close off the groove 84.

It will be appreciated, whether or not shown in either in the illustration of FIG. 6 or FIG. 7, that the respective plates 80 and 90 will have suitable openings formed therein so that suitable fluid couplings can be connected directly to the recesses at the opposite ends of the continuous grooves.

Referring again to FIG. 1, it will be seen that suitable coolant fluid may be supplied by hoses 100 and 102, the one being a supply and the other being a return. A connecting hose 104 may connect the mirror 32 with the mirror 14, so that either one of them is supplied, from the other, dependant upon which way round the coolant is being pumped at the time.

Suitable coolant pumping means will be supplied within the building (not shown) for circulating coolant through the pipes 100-102.

Typically, the coolant will be passed through some form of heat exchanger (not shown) within the building in order to recover the heat which is collected from the mirrors 14 and 32.

After 32, and also of course to reduce the temperature of the coolant liquid, so as to maintain efficient cooling of the two mirrors. Typically, the coolant liquid will be required to be operated both in summer and in winter. Consequently, a coolant liquid resistant to freezing must be employed. Ethylene glycol, or mixtures thereof with water, such as are used in automobile radiators should be entirely adequate for the purpose, although other freezing resistant cooling liquids may be used in certain circumstances.

Also illustrated in FIG. 1, in phantom, is the range of movement typically provided in temperate climates, for the mirror 10. This is necessary because clearly in such climates the sun is lower in winter, and higher in summer. In climates at or close to the equator, then the polar axis would be essentially horizontal, since the polar axis column 30 by definition must be located parallel to the polar axis of the earth at the latitude at which the installation is mounted.

It will thus be seen that by means of the coaxial rotatable coupling 26 and motor 28, and hinge 23, and motor 34, the concave collector mirror 10 can be effectively aimed directly at the sun, and can be swung about an arc to track the sun over a predetermined period of the daylight hours for each day of the year.

In order to provide for accurate tracking of the position of the sun, throughout the hours of daylight, some form of control system is provided which typically will be a computer console indicated generally as C (FIG. 1) it will be coupled both to motor 28, and to motor 34.

Control C will cause the motor 28 to rotate. The rotatable column portion 24, from sunrise to sunset, to track the position of the sun.

Motor 34 will typically be operated at sunrise each day, so as to adjust the angle of the mounting column 20, to account for the change in azimuth angle of the sun each day.

The width of the sun relative to the earth, represents an arc of one half a degree of angle. Consequently, it is necessary to maintain tracking accuracy to within about one half degree, both by motor 28 and by motor 34.

Motor 28 will typically be operated continuously throughout the hours of daylight, and at sunset will then simply be operated in the reverse direction so as to swing the mirror back to the sunrise position. The reverse rotation of motor 28 will of course be required to take place at a speed greater than the forward rotation, especially during the summer hours, since the hours of sunlight are longer than the hours of darkness.

The motor 28 will be suitably designed and controlled to ensure that this takes place.

It will of course be appreciated that since the sunrise position of the sun will alter daily, the return movement of the motor 28 will also be adjusted on a daily basis by the Control C, so that the mirror 10 is aimed directly at the sunrise position for the next morning.

In some cases it may be desirable to still further increase the efficiency of the device, by continuous, or periodical intermittent movement of the motor 34. This is because the azimuth angle of the sun changes continuously. While the total change during any one day is small, it may be desirable in some circumstances to operate the motor to make minute adjustments in the angle of the mounting column 20 at periodical intervals during the day, and provision may be made for this in the Control C.

A protective flexible shield of suitable ribbed material such as rubber or synthetic material indicated generally as P may be provided around the hinge 23. Any suitable similar protective means (not shown) may also be provided around the rotary coupling 26, so as to make the entire system weatherproof.

As mentioned above, once the light beam has been guided into the insulated interior of the building, it is then used for conversion into a more useful form of energy.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A polar axis solar collector system for use in association with a building located at a predetermined latitude, defining an exterior and interior, and said system comprising;

generally concave collector mirror means having front and rear sides and being adapted to be located on the exterior to receive the rays of the sun and defining a focal point;

secondary reflector means located on said front side of said collector mirror means substantially at the focal point of said collector mirror means whereby to receive the sun's rays reflected from said collector mirror means and redirect them along a central axis of said collector mirror means;

opening means in said concave mirror means to receive said concentrated beam of the sun's rays reflected from said secondary reflector means;

a tubular mounting column secured to said collector mirror means coaxial with said central axis of said collector mirror means registering with said opening means in said collector mirror means;

a moveable tubular polar axis column portion swingably connected to said tubular mounting column;

a fixed tubular polar-axis column portion, said moveable polar axis column portion being rotatably connected thereto and being adapted to be mounted on an axis parallel to the polar axis of the earth, at a predetermined latitude;

third reflector means movably located at the junction of said tubular mounting column and said moveable tubular polar axis column portion to receive said concentrated beam of the sun's rays from said secondary reflector reflected through said opening means in said collector mirror means, and to redirect said concentrated beam along said moveable tubular polar axis column portion and said fixed tubular polar axis column portion being adapted to be mounted on an axis parallel to the polar axis of the earth, at a predetermined latitude and extend into said building whereby said beam passes from the exterior to the interior of said building in said fixed polar axis column portion; reflector means about the axis of said fixed tubular polar axis column portion;

power means for swinging said tubular mounting column relative to said moveable tubular polar axis column portion, and, means for swinging said third reflector means in unison with swinging of said tubular mounting column.

2. A polar axis solar collector system as claimed in claim 1 wherein said third reflector means is a reflector moveable on an axis transverse to the central axis of said tubular mounting column, and wherein said collector mirror means is moveable on around an arc relative to said fixed tubular polar axis column portion, movement of said third reflector means being co-ordinated with movement of said collector mirror means, whereby to maintain said light beam along a path passing along said fixed tubular polar axis column portion.

3. A polar axis solar collector system as claimed in claim 1 and wherein at least said third reflector means includes cooling means for cooling said third reflector means and means for circulating a cooling medium therethrough.

4. A polar axis solar collector system as claimed in claim 3 and including further cooling means for cooling said secondary reflector means.

5. A polar axis solar collector system as claimed in claim 2 and including gear means collecting said third reflector means to said mounting column means whereby to cause said third reflector means to swing in unison with said mounting column means at a two-to-one reduction as compared with said mounting column means.

6. A polar axis solar collector system as claimed in claim 4 including coolant supply means, connected to one of said secondary and third reflector means, and coolant flow return means connected to the other of said secondary and said third reflector means, and coolant flow connection means connecting between said secondary and said third reflector means.

7. A polar axis solar collector system as claimed in claim 2 wherein said third reflector means is of generally elliptical shape in plan.

8. A method of collecting solar energy and comprising the steps of:

directing a generally concave collector mirror along a predetermined path, said mirror defining a focal point, whereby the sun's rays fall upon said mirror and reflect causing said reflected rays to converge at said focal point of said collector mirror;

reflecting said rays from a secondary mirror at the focal point of said collector mirror whereby to generate the same into an intensified beam of rays;

directing said beam through opening means along said central axis of said collector mirror, and directing said beam from said opening means through mounting column means on to a third mirror;

redirecting said beam of rays from said third mirror along a predetermined path enclosed by polar axis column means redirecting said beam of rays from said third mirror along a predetermined path enclosed by polar axis column means mounted at an angle parallel to the polar axis of the earth at the location of said collection mirror;

conducting said redirected beam into a building interior, along said polar axis column means;

continuously swinging said mounting column means, thereby moving said collector mirror whereby to maintain said path directed constantly at the sun, at least during a predetermined period of the daylight hours, and, intermittently causing angular movement of said mounting column means and of said third mirror relative to said polar axis column means.

9. A method, as claimed in claim 8, wherein said collector mirror is moved in an arc around said polar axis column means whereby to continuously track the position of the sun, at least during a predetermined period of the daylight hours.

10. A method as claimed in claim 8 wherein said third mirror is moveable, about a horizontal axis, in coordination with movement of said mounting column means and is focused along said polar axis column means, whereby to maintain said redirected beam on a predetermined fixed pathway within said polar axis column means.

* * * * *